Patented Oct. 10, 1950

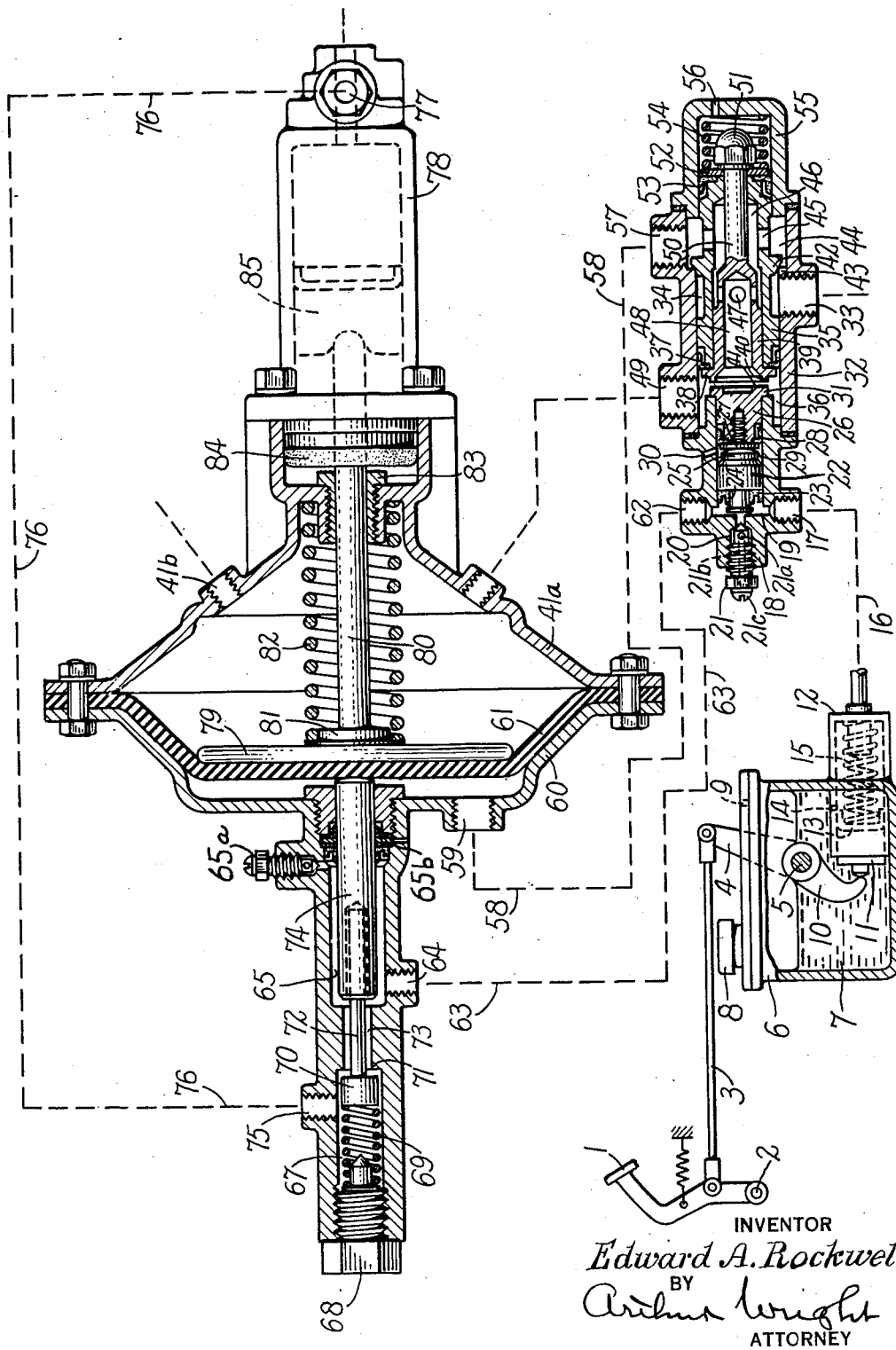

2,525,426

UNITED STATES PATENT OFFICE 2,525,426

HYDRAULIC CONTROLLED APPARATUS FOR APPLYING POWER WITH TRAVEL CONTROL

Edward A. Rockwell, Cleveland, Ohio

Original application June 13, 1941, Serial No. 397,896, now Patent No. 2,372,014, dated March 20, 1945. Divided and this application October 11, 1944, Serial No. 558,217

14 Claims. (Cl. 60—54.5)

My invention relates particularly to an apparatus designed for actuating the movement of any desired part in such a way as to coordinate the travel of said part with the travel of the means which actuates the same.

This application is a division of my application upon Travel Control Actuating Apparatus, Ser. No. 397,896, filed June 13, 1941, Pat. No. 2,372,014, granted March 20, 1945.

The object of my invention is to provide an apparatus of the above character whereby parts to be moved may be effectively operated through the agency of a fluid while coordinating the travel of the part to be moved with the means for moving the same. A further object is to accomplish this by applying any desired modulated pressure at any point in the said movement. Another object is to provide a hydraulically operated brake in which a master cylinder controls a power operated motor by supplying the master cylinder liquid to the motor and to the brake. Still another object is to accomplish the same by the utilization of a vacuum. Further objects of my invention will appear from the detailed description of the same hereinafter.

While my invention is capable of embodiment in many different forms for the purpose of illustration I have shown only one form of the same in the accompanying drawing, in which—

The figure is a view of the apparatus applied to the operation of vacuum controlled brake systems without the utilization of a vacuum power unit.

In the drawing, the travel controlled features of my invention are applied to the operation of automotive vehicle brake systems involving the use of a vacuum. As shown in said figure, I have provided a pedal 1 carried by a fixed pivot 2 on the chassis of an automobile (not shown). The pedal 1 is pivotally connected by a link 3 to an operating lever 4 mounted on a shaft 5 extending into a master cylinder 6, which may be of any desired construction, as for example the master cylinder as disclosed in the Loughead Patent No. 1,707,063, granted March 26, 1929, on Pressure Mechanism for Brake Systems. As shown in the drawings, for example, the master cylinder 6 may have the usual reservoir 7 and the usual filling cap 8 as well as the usual vent 9. The shaft 5 which extends into the master cylinder 6, furthermore, may be provided with an operating lever 10 which bears on a piston 11 in a cylinder 12 provided with a piston 13 so placed that in the retracted position thereof it uncovers a compensating port 14. The said piston 13 is retracted by a spring 15. The liquid discharged from the master cylinder 6 is supplied by a pipe 16 to an inlet port 17 which is located in a plunger housing 18 having therein a chamber 19. The chamber 19 can be vented from time to time, as desired, through a passageway 20 leading to an air bleeder screw plug 21 having a transverse passageway 21a leading to a longitudinal passageway 21b which is adapted to be closed normally by a removable screw plug 21c. Within the chamber 19 there is a plunger 22 having a U-shaped rubber seal 23 carried in an annular recess 24 on the forward part of said plunger. The rear of said plunger 22 has an extension 25 which is arranged to move rearwardly a valve plunger 26 having a screw head 27 thereon holding in place a leather gasket 28. Between the extension 25 and the screw head 27 there is a space 29 which is vented to the outer air through a small port 30. The rear end of the valve plunger 26 has a flange 31 which extends over the end of the plunger housing 19 within a valve casing 32. The said valve casing 32 has a port 33 which is adapted to act as a vent and which is connected to an annular chamber 34 on the periphery of a cylindrical valve member 35 located in a cylindrical chamber 36 in the valve casing 32 within which it is sealed by a leather gasket 37 which is located adjacent to a flange 38 on an internal tubular valve member 39 located within the valve member 35. The said internal tubular valve member 39 is, furthermore, provided with an annular valve element 40 which cooperates with a valve seat 41 on the valve plunger 26. Adjacent to the chamber 34 the valve member 35 has located thereon a tapered valve element 42 which cooperates with a valve seat 43 on the valve casing 32. When the conical valve 42 is unseated the air is then admitted to an annular chamber 44 in the casing 32, which in turn admits the air through radial ports 45 in the valve member 35 to a cylindrical chamber 46 in the cylindrical valve member 35 in which chamber the internal valve member 39 is located. The air thus admitted to the chamber 46 can pass through radial openings 47 in the internal tubular valve member 39 to a cylindrical chamber 48 within said member 39 so that when the valve 40, 41 is open the released air can pass out through a vacuum port 49 in the casing 32 and thence to a rear diaphragm housing 41a having a vacuum port 41b leading to any desired source of vacuum, as for instance the engine manifold of the vehicle motor. It will be noted that the internal tubular valve member 39 has extending rearwardly therefrom a rod 50 which passes through the end of the valve member 35 and is held in place thereon by a nut 54 which, by means of a washer 52, clamps in place a leather gasket 53. A spring 54 rests against the said washer 52 and at the other ends rests against the inside of a head 55 secured to the valve casing 32. The head 55 also has a vent 56. The said head 55 and the plunger housing 18 can be secured to the valve casing 32 in any desired way. The air when admitted to the chamber 46, when the valve 40, 41 is in closed position, passes out by an air port 57 by a pipe 58 to an inlet port 59 in a forward diaphragm shell 60 having a flexible diaphragm 61 of any desired material impervious to the air, for example a laminated oil-treated woven fabric, clamped between the two shells 41a and 60. This supply of air through the pipe 58 will not take place, however, until after sufficient pressure has been exerted through the pipe 16 so as to move the plunger 22, close the valve 40, 41 and open the valve 42, 43. Before the said valves are moved in this way, however, the manual hydraulic pressure will have passed initially from the chamber 19 through the outlet port 62 and thence through a pipe 63 to an inlet opening 64 which leads to a chamber 65, having a bleeder valve 65a and an air and oil seal 65b, in the forward shell 66, which has an extension provided with a chamber 67 normally closed by a plug 68. A light spring 69 is provided, resting at one end thereof against the plug 68 and at the other end on a liquid compensating valve head 70 adapted to seat on a shoulder 71 within the said chamber 67. The valve head 70 has a valve stem 72 which extends through an opening 73 and thence into a bore in a plunger 74, said bore being larger in diameter than said stem 72 and acting as a guide for the stem 72. Said extension of the forward shell 66 has a port 75 which is connected by a pipe 76 to a port 77 on the discharge side of a master cylinder 78. Against the rear face of the flexible diaphragm 61 a head 79 rests, which is carried on a piston screw-threaded to a recessed ring 81 attached to said head 79. A coil spring 82 rests at one end against the ring 81 and at the other end against the interior of the shell 41a. The piston rod 80 passes out through a screw-threaded bushing 83 and thence through a liquid-tight packing 84 to the interior of the master cylinder 78, where it rests against the end of a master cylinder piston 85.

In the operation of my invention, it will be understood that the apparatus is designed, preferably, for the operation of vacuum brakes of any desired system and which may be applied to the operation of brakes of vehicles generally. In other words, it may be applied, if desired, to the operation of any present form of vacuum air-brake system. In the apparatus as shown, when it is desired to apply the brakes the pedal 1 is moved downwardly, thereupon discharging liquid from the master cylinder 12, which is replenished with liquid in the retracted position of the piston 11 by the port therein which communicates with the liquid reservoir 7. The liquid thus supplied to the pipe 16 will pass initially through the pipe 63 to the port 64, thence to the chamber 67 past the spring-pressed valve 70 and, by means of the pipe 75, to the port 76 and thence to the wheel brakes, thus setting the brakes preparatory to applying the main braking force. Upon a further increase of pressure in the pipe 16 from the master cylinder the piston 22 will be moved towards the right, thereby exerting a pressure on the valve 40, 41 and thereafter unseating the valve 42, 43 which allows atmospheric air to enter through the port 33 so as to be supplied by the pipe 58 to the left side of the movable wall in the casing 60, thus seating the valve 70 by the action of the spring 69 and cutting off the supply of the liquid from the master cylinder to the wheel brakes. Thereafter, the liquid is supplied under pressure to the wheel brakes from the intensifying cylinder 78. This operation will continue as long as the manual pressure is being increased through the pipe 16. When any particular point is reached while the manual pressure is not being increased, the pressure of the air which has been admitted past the valve 42, 43 will accumulate slightly to overcome the manual pressure so as to act on the valve plunger 26 so as to lap the said valve 42, 43. Upon relaxation of the manual pressure through the pipe 16 the valve 40, 41 will be opened, thereby discharging the accumulated air through the port 49, thereupon restoring the valve 70 to open position by the movement of the wall to the left limit of its position in the casing 60 due to the pressure from spring 82 and cylinder 78. The brake shoes, as a result, will be released to their initial position, out of engagement with the brake drums.

While I have described my invention above in detail I wish it to be understood that many changes may be made therein without departing from the spirit of the same.

I claim:

1. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a communication with the master cylinder, and a shut-off valve in said communication which is operable by the movable wall to closed position by the initial movement of the movable wall on the pressure-increasing stroke and located on the opposite side of the movable wall from said plunger.

2. In an apparatus for use with a master cylinder having an outlet conduit, and a source of pressure differing from the atmosphere, the combination of a movable wall having a casing, a valve operable from the master cylinder, having a fluid connection, for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a shut-off valve and a shut-off valve cylinder in said communication, a plunger connected to the movable wall to move coordinately with said wall, a plunger, having a cylinder, provided with a conduit, connected to the outlet conduit from said master cylinder to communicate with said pipe through the shut-off valve, said last mentioned plunger being connected to operate the first mentioned valve and said movable wall plunger being connected to operate the shut-off valve, said master cylinder and hydraulic cylinder having a hydraulic connection between the same located outside the bore of each cylinder.

3. In an apparatus for use with a master cylinder having an outlet conduit, and a source of pressure differing from the atmosphere, the combination of a movable wall having a casing, a valve operable from the master cylinder, having a fluid connection, for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a shut-off valve in said communication, a plunger, having a cylinder, provided with a conduit, connected to the outlet conduit from said master cylinder to communicate with said pipe through the shut-off valve, said last mentioned plunger being connected to operate the first mentioned valve and said movable wall plunger being connected to operate the shut-off valve, said shut-off valve, having a plunger and cylinder, being mounted so as to be removable outwardly from the end of the last mentioned plunger cylinder.

4. In an apparatus for use with a master cylinder, and a source of pressure differing from the atmosphere, the combination of a movable wall having a casing, a valve operable from the master cylinder, having a fluid connection, for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a second plunger, for operating said valve, in a cylinder located in the communication from the master cylinder, a shut-off valve and plunger in said communication, a seal between the shut-off valve plunger and the movable wall, and an air bleeder located in the cylinder for the shut-off valve plunger near said seal.

5. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a second plunger, for operating said valve, in a cylinder located in the communication from the master cylinder, a shut-off valve and plunger in said communication, a seal between the shut-off valve plunger and the movable wall, and an air bleeder located in the cylinder for the shut-off valve plunger near said seal, said second plunger cylinder having an inlet, from the master cylinder, between the air bleeder and the shut-off valve.

6. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a second plunger, for operating said valve, in a cylinder located in the communication from the master cylinder, a shut-off valve and plunger in said communication, a combined air and oil seal between the shut-off valve plunger and the movable wall, a cylinder for the second plunger, and an air bleeder located in the cylinder for the shut-off valve plunger.

7. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a communication with the master cylinder, and a normally open spring-pressed shut-off valve in said communication, having a plunger for releasing the valve to seat the same, which is operable by the liquid from the master cylinder to closed position by the initial movement of the movable wall on the pressure-increasing stroke, said shut-off valve comprising a stationary valve seat and a valve member arranged to seat on the stationary valve seat.

8. In an apparatus for use with a master cylinder having an outlet conduit, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a normally open spring-pressed shut-off valve in said communication, having a plunger for releasing the valve to seat the same, a plunger having a cylinder connected to the outlet conduit from said master cylinder to communicate with said pipe through the shut-off valve, said last mentioned plunger being connected to operate the first mentioned valve and said movable wall plunger being connected to operate the shut-off valve, said master cylinder and hydraulic cylinder having a hydraulic connection between the same located outside the bore of each cylinder, said shut-off valve comprising a stationary valve seat and a valve member arranged to seat on the stationary valve seat.

9. In an apparatus for use with a master cylinder having an outlet conduit, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a normally open spring-pressed shut-off valve in said communication, having a plunger for releasing the valve to seat the same, a plunger having a cylinder connected to the outlet conduit from said master cylinder to communicate with said pipe through the shut-off valve, said last mentioned plunger being connected to operate the first mentioned valve and said movable wall plunger being connected to operate the shut-off valve, said shut-off valve, having a cylinder, being mounted so as to be removable outwardly from the end of the shut-off valve cylinder, said shut-off valve comprising a stationary valve seat and a valve member arranged to seat on the stationary valve seat.

10. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a communication with the master cylinder, and a shut-off valve in said communication, having a cylinder and a plunger, which is operable with the movable wall to closed position by the initial movement of the movable wall on the pressure-increasing stroke and located outside of said cylinder, said shut-off valve comprising a stationary valve seat and a valve member arranged to seat on the stationary valve seat.

11. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a second plunger, for operating said valve, in a cylinder located in the communication from the master cylinder, and a shut-off valve in said communication having a cylinder and a plunger, outside said hydraulic cylinder, arranged to be closed with the movement of the movable wall by the operation of said first mentioned valve, said shut-off valve comprising a stationary valve seat and a valve member arranged to seat on the stationary valve seat.

12. In an apparatus for use with a master cylinder, and a souce of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a second plunger, for operating said valve, in a cylinder located in the communication from the master cylinder, a normally open spring-pressed shut-off valve in said communication having a plunger to release the valve to seat the same, a seal between the second plunger and the movable wall, a cylinder for the shut-off valve plunger and an air bleeder located in the cylinder for the valve-releasing plunger near said seal, said shut-off valve comprising a stationary valve seat and a valve member arranged to seat on the stationary valve seat.

13. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a second plunger, for operating said valve, in a cylinder located in the communication from the master cylinder, a normally open spring-pressed shut-off valve in said communication having a plunger for releasing the valve to seat the same, a seal between the valve-releasing plunger and the movable wall, a cylinder for the shut-off valve plunger and an air bleeder located in the cylinder for the valve-releasing plunger near said seal, said valve-releasing plunger cylinder having an inlet, from the master cylinder, between the air bleeder and the shut-off valve, said shut-off valve comprising a stationary valve seat and a valve member arranged to seat on the stationary valve seat.

14. In an apparatus for use with a master cylinder, and a source of pressure differing from the atmosphere, the combination of a movable wall having a casing, a valve operable from the master cylinder for controlling the application of said pressure to the movable wall, a pressure-increasing plunger connected to the movable wall, a hydraulic cylinder for said plunger, a hydraulic delivery connection leading from said hydraulic cylinder, having a pipe for communication with the master cylinder, a second plunger, for operating said valve, in a cylinder located in the communication from the master cylinder, a normally open spring-pressed shut-off valve in said communication, a combined air and oil seal between the valve-releasing plunger and the movable wall, a cylinder for the shut-off valve plunger and an air bleeder located in the cylinder for the valve-releasing plunger, said shut-off valve comprising a stationary valve seat and a valve member arranged to seat on the stationary valve seat.

EDWARD A. ROCKWELL.

REFERENCES CITED

The following references are of record in the file of this patent:

UNITED STATES PATENTS

| Number | Name | Date |
|---|---|---|
| Re. 22,965 | Gates | Jan. 20, 1948 |
| 1,885,235 | Davis | Nov. 1, 1932 |
| 2,032,185 | Sciaky | Feb. 25, 1936 |
| 2,218,191 | Dick | Oct. 15, 1940 |
| 2,252,482 | Gates | Aug. 12, 1941 |
| 2,260,491 | Stelzer | Oct. 28, 1941 |
| 2,308,149 | Bingham | Jan. 12, 1943 |
| 2,328,637 | Freeman | Sept. 7, 1943 |
| 2,372,014 | Rockwell | Mar. 20, 1945 |

FOREIGN PATENTS

| Number | Country | Date |
|---|---|---|
| 477,173 | Great Britain | Dec. 23, 1937 |
| 835,760 | France | Oct. 3, 1938 |